(12) United States Patent
Heuser

(10) Patent No.: US 10,637,875 B2
(45) Date of Patent: Apr. 28, 2020

(54) AUTOMATED CLASSIFICATION OF DOMAIN NAMES RESOLVED BY MALWARE

(71) Applicant: EMC IP Holding Company LLC, Hopkinton, MA (US)

(72) Inventor: Erik M. Heuser, Manassas, VA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 19 days.

(21) Appl. No.: 15/951,361

(22) Filed: Apr. 12, 2018

(65) Prior Publication Data
US 2018/0234439 A1    Aug. 16, 2018

Related U.S. Application Data

(63) Continuation of application No. 15/274,091, filed on Sep. 23, 2016, now Pat. No. 10,015,180.

(51) Int. Cl.
*H04L 29/06* (2006.01)
*H04L 29/12* (2006.01)

(52) U.S. Cl.
CPC ...... *H04L 63/1416* (2013.01); *H04L 61/1511* (2013.01); *H04L 63/1425* (2013.01)

(58) Field of Classification Search
CPC ............ H04L 63/1416; H04L 63/1425; H04L 61/1511
See application file for complete search history.

(56) References Cited

U.S. PATENT DOCUMENTS

| 8,631,489 B2 * | 1/2014 | Antonakakis ....... H04L 61/1511 709/223 |
| 8,694,659 B1 * | 4/2014 | Stahl .................. H04L 61/6009 380/200 |

(Continued)

FOREIGN PATENT DOCUMENTS

CN    102930210 A  *  2/2013

OTHER PUBLICATIONS

Bradley Mitchell, What Does Dynamic DNS Mean? DDNS services create permanent names for dynamic IP addresses, updated Nov. 11, 2019, https://www.lifewire.com/definition-of-dynamic-dns-816294.

*Primary Examiner* — Mahfuzur Rahman
(74) *Attorney, Agent, or Firm* — Ryan, Mason & Lewis, LLP

(57) ABSTRACT

Techniques are provided for automated classification of domain names resolved by malware. An exemplary method comprises obtaining a domain name included in malware domain resolution requests; obtaining a domain table identifying a plurality of known domains; obtaining a dynamic domain table identifying a plurality of dynamic Domain Name System domains; parsing a full domain name associated with the domain name from the malware domain resolution requests into a Top Level Domain and a Domain; classifying the domain from the malware domain resolution requests name as a dynamic Domain Name System domain if the Top Level Domain and the Domain are found in the dynamic domain table; and storing the classification of the domain name from the malware domain resolution requests as the dynamic Domain Name System domain in the domain table with a complete domain of the domain, a current date and time and a Time-To-Live attribute of the domain from a response of the Domain Name System.

20 Claims, 6 Drawing Sheets

(56) References Cited

U.S. PATENT DOCUMENTS

| | | | |
|---|---|---|---|
| 8,863,288 B1* | 10/2014 | Savage | G06F 21/567 |
| | | | 713/188 |
| 9,516,058 B2* | 12/2016 | Antonakakis | H04L 63/1483 |
| 9,686,291 B2* | 6/2017 | Antonakakis | H04L 61/1511 |
| 9,930,065 B2* | 3/2018 | Nelms | H04L 63/145 |
| 10,027,688 B2* | 7/2018 | Perdisci | H04L 63/1416 |
| 10,397,253 B2* | 8/2019 | Baughman | G06F 17/2705 |
| 2007/0214142 A1 | 9/2007 | Goyal | |
| 2009/0222584 A1 | 9/2009 | Josefsberg | |
| 2010/0332680 A1 | 12/2010 | Anderson | |
| 2011/0110235 A1 | 5/2011 | Ukita | |
| 2012/0198549 A1* | 8/2012 | Antonakakis | H04L 61/1511 |
| | | | 726/22 |
| 2012/0271877 A1 | 10/2012 | Nicks | |
| 2013/0232574 A1 | 9/2013 | Carothers | |
| 2016/0364771 A1* | 12/2016 | Nielsen | H04L 67/20 |
| 2017/0195439 A1* | 7/2017 | Dixon | H04L 61/2007 |
| 2017/0318035 A1* | 11/2017 | Baughman | H04L 63/1416 |
| 2018/0139224 A1* | 5/2018 | Arnell | H04L 41/12 |

* cited by examiner

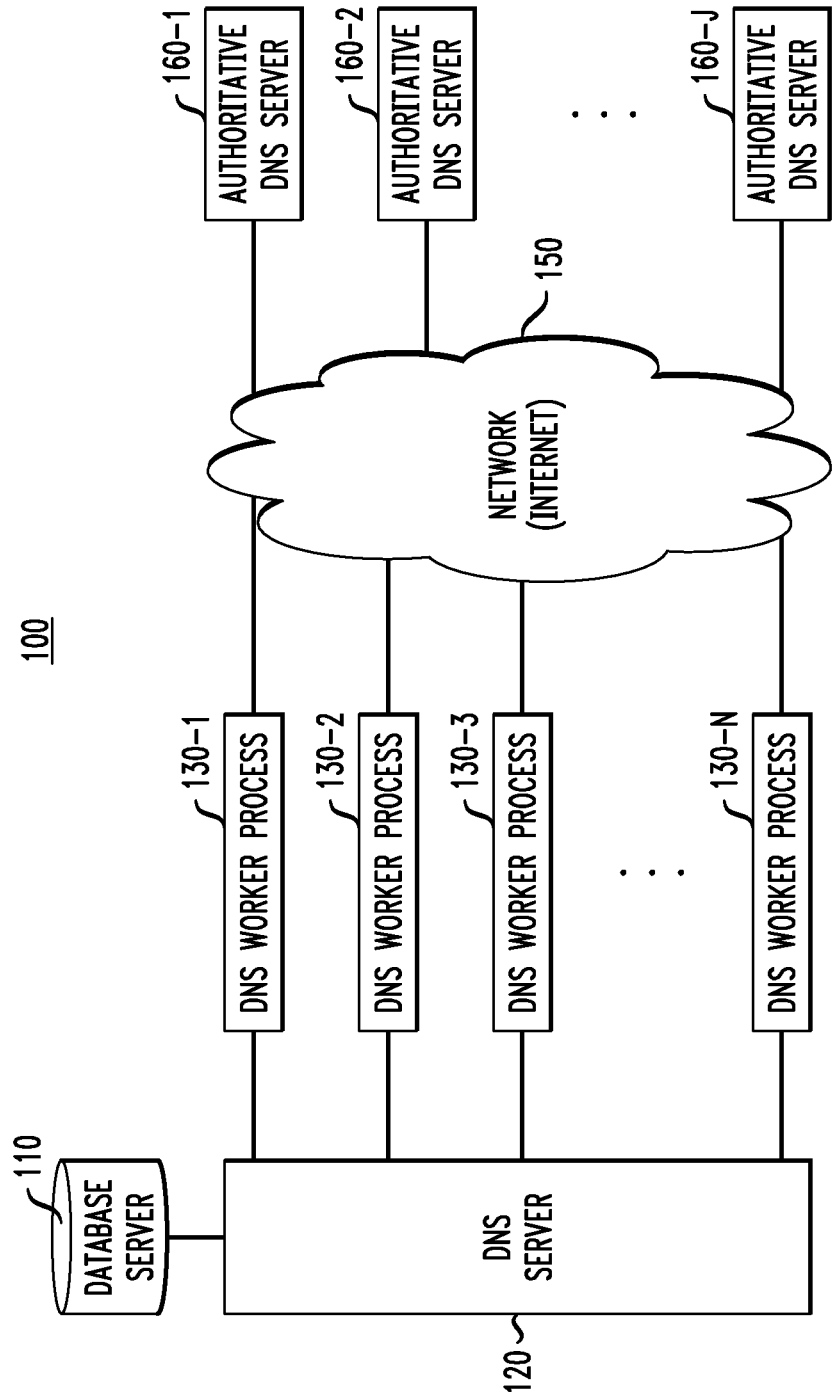

FIG. 2

| DOMAIN | SOURCE | MD5sum | ENTRYDATE | CATEGORY | TTL |
|---|---|---|---|---|---|
| hiarclemagic.ddns.net | cuckoo | 2034f187452cdac87ce962d21f9ca2de | 1436470863 | DynDNS | 0 |
| clients4.google.com | cuckoo | 3d805936762fbe4e0c915680633364282 | 1436470864 | Whitelist | 1474033987 |
| checkip.dyndns.org | cuckoo | 3d805936762fbe4e0c915680633364282 | 1436470864 | DynDNS | 1474031143 |
| translate.googleapis.com | cuckoo | 3d805936762fbe4e0c915680633364282 | 1436470864 | Whitelist | 1474033712 |
| miyou-951.no-ip.biz | cuckoo | bd5886794b41317b5453ad6761d5d5b4 | 1436470864 | DynDNS | 1474035501 |
| ali1985as.ddns.net | cuckoo | 8c2aebc94de2515f92cba7c3918650cc | 1436470865 | DynDNS | 0 |
| magico.no-ip.biz | cuckoo | 6dc17d30c4769246d285d9845b519d80 | 1436470865 | DynDNS | 1474033085 |
| aiss12.no-ip.biz | cuckoo | 2c74a4c56053ec4c07002c86333c0fcd | 1436470865 | DynDNS | 1474035599 |
| proxy.pl.abb.com | cuckoo | d3ad90010c701e7318835142fabb6fcc | 1436470867 | Whitelist | 0 |
| isacat01.gicp.net | cuckoo | d3ad90010c701e7318835142fabb6fcc | 1436470867 | DynDNS | 1474035662 |

*FIG. 3*

| DOMAIN | IP | EpochTime |
|---|---|---|
| www.icall.com | 162.159.243.136 | 1436797615 |
| landstuhl.dyndns.biz | 91.45.26.115 | 1436797615 |
| javahack.myweb.hinet.net | 61.219.39.180 | 1436797615 |
| q380886882.gnway.net | 189.163.17.5 | 1436797615 |
| cdnus.secureddownloadcdn.com | 199.201.110.78 | 1436797615 |
| corpit.daveandlea.com | 50.63.202.36 | 1436797615 |
| rantan.2waky.com | 87.100.148.153 | 1436797615 |
| sopakilkil.fileave.com | 208.73.210.217 | 1436797615 |
| salvia.us.to | 87.98.255.18 | 1436797615 |
| specht.homeunix.com | 92.252.8.211 | 1436797615 |

*FIG. 4*

| DOMAIN |
|---|
| -1.net |
| -2-b.com |
| -7r.com |
| -a-d.de |
| -abe.or.jp |
| -active.ru |
| -adler.ru |
| -advance.ga |
| -ajfan.com |
| -alpha.co.jp |

*FIG. 5*

| DOMAIN |
|---|
| 0-1-2-3-4-5-6-7-8-9-10-11-12-13-14-15-16-17-18.com |
| 0-1-2-3-4-5-6-7-8-9-10-11-12-13-14-15-16-17-18.net |
| 0-u.org |
| 00-1.tk |
| 00-net.info |
| 00-org.info |
| 000000000000000000000.com |
| 00010001.com |
| 00070.com |
| 000webhost.com | ature of the at least one domain from a response of the Domain
AUTOMATED CLASSIFICATION OF DOMAIN NAMES RESOLVED BY MALWARE

CROSS-REFERENCE TO RELATED APPLICATIONS

This application is a continuation of U.S. patent application Ser. No. 15/274,091, filed Sep. 23, 2016 (now U.S. Pat. No. 10,015,180), incorporated by reference herein.

FIELD

The invention relates generally to computer networks, and more particularly, to techniques for resolving and classifying domain names on such computer networks.

BACKGROUND

The Domain Name System (DNS) distributes the mapping of hostnames of hosts on the Internet to IP (Internet Protocol) addresses automatically online through recursive queries to remote databases configured for each network, or domain. Dynamic DNS is a method of automatically updating a name server in the DNS by dynamically assigning IP addresses to computers automatically as they power up.

Malware is often executed and analyzed in a sandbox environment by threat intelligence researchers. The output from these sandbox executions contains network traffic analysis such as domains resolved and IP addresses contacted during the sandbox execution. As part of the analysis, the threat intelligence researcher must often resolve a large number of domain names, requiring frequent access to the Dynamic DNS system. The Dynamic DNS system, however, includes protection mechanisms that perform IP blocking of DNS resolution requests by the DNS servers if certain access criteria are present.

A need therefore exists for improved techniques for automated classification of domain names resolved by malware.

SUMMARY

Illustrative embodiments of the present invention provide techniques for automated classification of domain names resolved by malware. In one exemplary embodiment, a method comprises the steps of obtaining at least one domain name included in one or more malware domain resolution requests; obtaining a domain table identifying a plurality of known domains; obtaining a dynamic domain table identifying a plurality of dynamic Domain Name System domains; parsing a full domain name associated with the at least one domain name from the one or more malware domain resolution requests into a top level domain and a domain; classifying the at least one domain from the one or more malware domain resolution requests name as a dynamic Domain Name System domain if the top level domain and the domain are found in the dynamic domain table; and storing the classification of the at least one domain name from the one or more malware domain resolution requests as the dynamic Domain Name System domain in the domain table with a complete domain of the at least one domain, a current date and time and a time-to-live attribute of the at least one domain from a response of the Domain Name System.

These and other illustrative embodiments include, without limitation, methods, apparatus, systems, computer networks and computer program products comprising processor-readable storage media.

BRIEF DESCRIPTION OF THE DRAWINGS

FIG. 1 illustrates an asynchronous DNS resolution system configured according to one embodiment of the invention;

FIG. 2 illustrates an exemplary database schema and example data for a domain table according to one embodiment of the invention;

FIG. 3 illustrates an exemplary database schema and example data for a domain-to-IP address table according to one embodiment of the invention;

FIG. 4 illustrates an exemplary database schema and example data for a trusted domain table according to one embodiment of the invention;

FIG. 5 illustrates an exemplary database schema and example data for a dynamic DNS domain table according to one embodiment of the invention;

DETAILED DESCRIPTION

Figure 6:
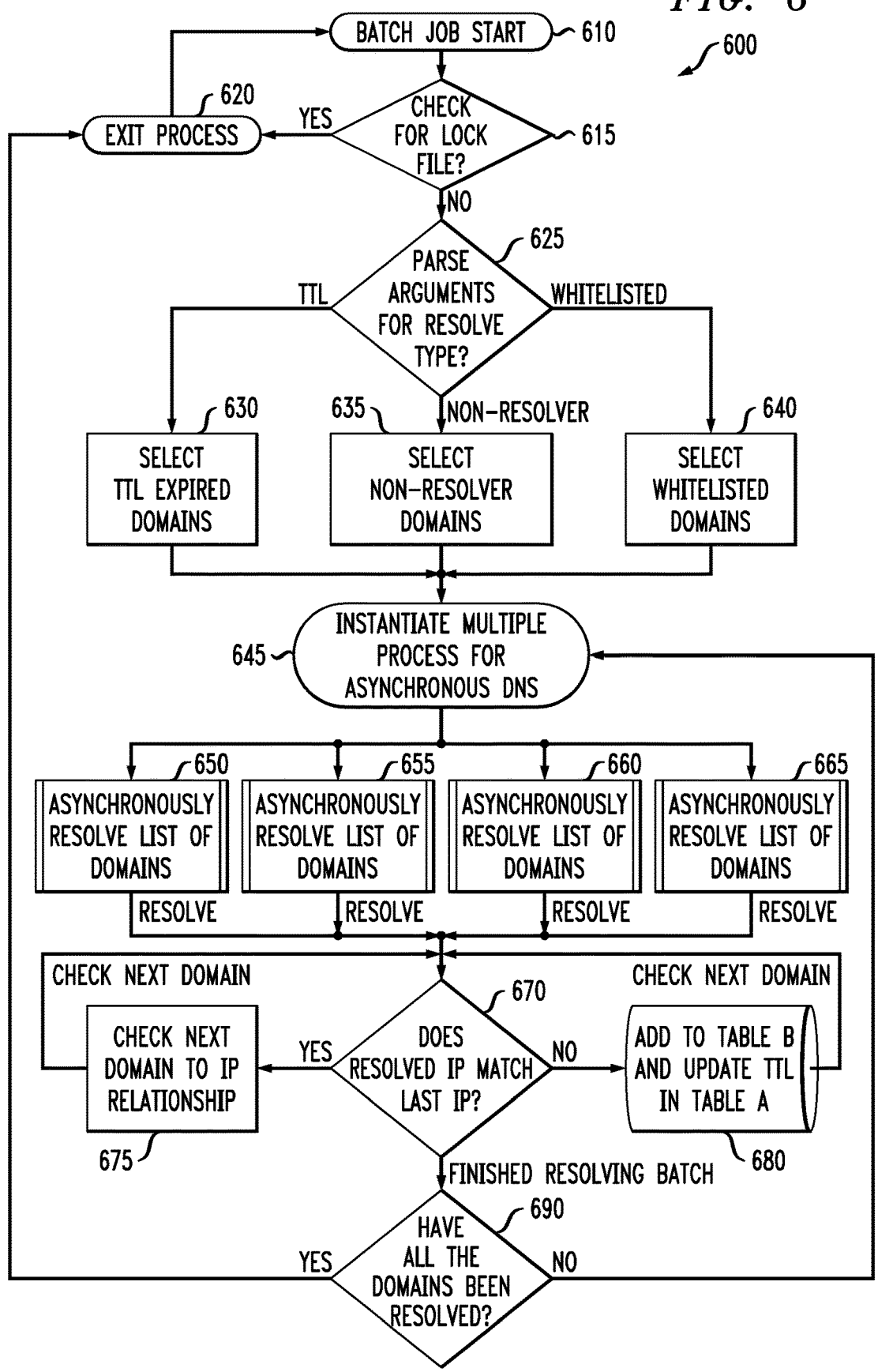
FIG. 6 is a flow chart illustrating an exemplary implementation of an asynchronous DNS resolution process according to one embodiment of the invention.

Illustrative embodiments of the present invention will be described herein with reference to exemplary communication, storage, and processing devices. It is to be appreciated, however, that the invention is not restricted to use with the particular illustrative configurations shown. Aspects of the present invention provide asynchronous techniques for resolving domain names and automated classification of domain type.

In one or more embodiments, domain-to-IP address relationships are classified and tracked and can later be reclassified in a manner that will retroactively affect the current and future classifications.

FIG. 1 illustrates an asynchronous DNS resolution system 100 configured according to one embodiment of the invention. Generally, the exemplary asynchronous DNS resolution system 100 resolves domain names to IP addresses based on predefined logical parameters.

As shown in FIG. 1, the exemplary asynchronous DNS resolution system 100 comprises a DNS server 120 that interacts with a database server 110 comprising stored files. The exemplary DNS server 120 executes an exemplary asynchronous DNS resolution process 600, discussed further below in conjunction with FIG. 6, that employs a plurality of DNS worker processes 130-1 through 130-N to communicate with a plurality of authoritative DNS servers 160-1 through 160-J over a network 150 (such as the Internet) to resolve a large number of domain names to IP addresses without triggering the IP blocking by the authoritative DNS servers 160. The exemplary database server 110 maintains a plurality of domain-related databases, as discussed further below in conjunction with FIGS. 2-5.

The exemplary DNS server 120 also optionally executes an exemplary automated domain classification process 700, discussed further below in conjunction with FIG. 7, that automatically classifies a given domain into one of a plurality of predefined classifications.

At least portions of the network 150 shown in FIG. 1 may comprise an "enterprise network." Numerous other operating scenarios involving a wide variety of different types and arrangements of processing devices and networks are possible, as will be appreciated by those skilled in the art. The network 150 is assumed to comprise a portion of a global computer network such as the Internet, although other types of networks can be part of the network 150, including a wide area network (WAN), a local area network (LAN), a satellite network, a telephone or cable network, a cellular network, a wireless network such as a WiFi or WiMAX network, or various portions or combinations of these and other types of networks. The network 150 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The DNS server 120 in the FIG. 1 embodiment is assumed to be implemented using at least one processing device, as discussed further below in conjunction with FIG. 9. Each such processing device generally comprises at least one processor and an associated memory, and implements one or more functional modules for controlling certain features of the DNS server 120.

FIG. 2 illustrates an exemplary database schema and example data for a domain table 200 according to one embodiment of the invention. The domain table 200 is also referred to herein as Table A. As shown in FIG. 2, the exemplary domain table 200 comprises a list of domains 210, and for each domain, the domain table 200 identifies the source 220 of the domain information, an identifier 230 of the domain, such as an MD5sum hash value or another hash value, a date 240 that the entry was entered, for example, in an Epoch format, a category 250 assigned for the domain (for example, using the automated domain classification process 700 of FIG. 7) and a last known time-to-live (TTL) attribute 260 when the domain was resolved.

Generally, the time-to-live attribute 260 is a setting for each DNS record specifying how long a resolver is supposed to cache (or remember) the DNS query before the query expires and a new one needs to be done. As noted above, the Dynamic DNS system includes protection mechanisms that perform IP blocking of DNS resolution requests by the DNS servers if certain access criteria are present. Public DNS servers are configured with self-protection mechanisms to avoid Denial of Service attacks and brute force lookups. For example, a DNS server may initiate IP blocking if a large number of domain resolution requests are received for domains having unexpired time-to-live attributes 260.

FIG. 3 illustrates an exemplary database schema and example data for a domain-to-IP address table 300 according to one embodiment of the invention. The domain-to-IP address table 300 is also referred to herein as Table B. As shown in FIG. 3, the exemplary domain-to-IP address table 300 comprises domain-to-IP relationships in columns 310 and 320, as well as a time 330, for example, in an Epoch format, when each domain-to-IP pair was observed.

FIG. 4 illustrates an exemplary database schema and example data for a trusted domain table 400 according to one embodiment of the invention. The trusted domain table 400 is also referred to herein as Table C. As shown in FIG. 4, the exemplary trusted domain table 400 comprises a list 410 of "known-good" Whitelisted Domains without sub-domains.

FIG. 5 illustrates an exemplary database schema and example data for a dynamic DNS domain table 500 according to one embodiment of the invention. The dynamic DNS domain table 500 is also referred to herein as Table D. As shown in FIG. 5, the exemplary dynamic DNS domain table 500 comprises a list 510 of dynamic DNS domains without sub-domains.

FIG. 6 is a flow chart illustrating an exemplary implementation of an asynchronous DNS resolution process 600 according to one embodiment of the invention. Generally, the exemplary asynchronous DNS resolution process 600 provides asynchronous DNS resolution logic for three exemplary types of domains and avoids IP blocking by the authoritative DNS servers 160. The exemplary asynchronous DNS resolution process starts every X minutes where X is determined to be a preferred minimum resolution desired for checking if a domain to IP relationship has changed.

As discussed hereinafter, the exemplary asynchronous DNS resolution process 600 determines how and when to resolve the domains asynchronously based on their classification and last known Time-To-Live attribute observed when it was last resolved.

As shown in FIG. 6, the batch job of the asynchronous DNS resolution process 600 is started during step 610. A test is performed during step 615 to determine if the file is locked to prevent multiple copies of the application from running. If it is determined during step 615 that the file is locked, then the process exits at step 620 and program control returns to step 610 until the file is unlocked. If, however, it is determined during step 615 that the file is not locked, then a further test is performed during step 625 to parse the arguments to resolve the domain type. The exemplary asynchronous DNS resolution process 600 operates in three modes (TTL expired domains, non-resolved domains and whitelisted domains) to ensure accuracy as well as avoid IP blocking by DNS servers. As noted above, public DNS servers are configured with self-protection mechanisms to avoid Denial of Service attacks and brute force lookups.

If it is determined during step 625 that the operating mode is a time-to-live mode, then TTL expired domains are selected during step 630. For example, TTL expired domains can be selected by querying for the current time, for example, in an Epoch format (e.g., 1472231419) and querying the domain table 200 (Table A) for domains that are not categorized as whitelisted with a TTL integer lower than the current time in Epoch format. In this manner, the domain table 200 acts as a generator and segments the list of domains to be resolved to be passed to the DNS worker sub-processes 130.

If it is determined during step 625 that the operating mode is a non-resolved mode, then non-resolving domains are selected during step 635. For example, non-resolved domains can be selected by quering the domain table 200 for entries with a TTL of 0. The domain table 200 again acts as a generator and segments the list of domains to be resolved to be passed to the DNS worker sub-processes 130.

If it is determined during step 625 that the operating mode is a whitelisted mode, then whitelisted domains are selected during step 640. Whitelisted domains can be selected by querying for the current time, for example, in Epoch format (e.g., 1472231419) and querying the domain table 200 for entries with a category of "whitelisted" and with a TTL integer lower than the current time in an Epoch format. The domain table 200 again acts as a generator and segments the list of domains to be resolved to be passed to the DNS worker sub-processes 130.

A plurality of DNS worker processes 650, 655, 660, 665 are instantiated during step 645 to perform the asynchronous DNS resolution of the domains selected in steps 630, 635, 640. In one or more embodiments, the number of sub-processes is configurable, as well as the number of domains that are passed as an array to these sub-processes for asynchronous DNS resolution. In at least one embodiment, the sub-processes 650, 655, 660, 665 are configured with a random sleep in seconds after acquiring a cursor to the database equal to the amount of sub-processes. The asynchronous DNS resolution is very fast, and the table locks that occur while checking IP to domain relationships and inserting new rows lock the tables. Offsetting the processing generally speeds up processing by tenfold. This does not necessarily need to be sub-processes but can be threaded based on the performance profile of threads-versus-processes in the chosen programming language.

A test is performed during step 670 to determine if each resolved IP address for the selected domains matches the last known IP address. If it is determined during step 670 that a given resolved IP address matches the last known IP address, then program control continues to compare the next resolved IP address during step 675. If, however, it is determined during step 670 that a given resolved IP address does not match the last known IP address, then the given resolved IP address is added to a new row of the domain-to-IP address table 300 (Table B) with the domain name, IP address and current time in Epoch format; and the time-to-live of the given resolved IP address is updated in column 260 of the domain table 200 during step 680.

A test is performed during step 690 to determine if there are additional resolved domains to process. If it is determined during step 690 that there are additional resolved domains to process, then program control returns to step 645. Once it is determined during step 690 that all resolved domains have been processed then the process exits at step 620.

Figure 7:
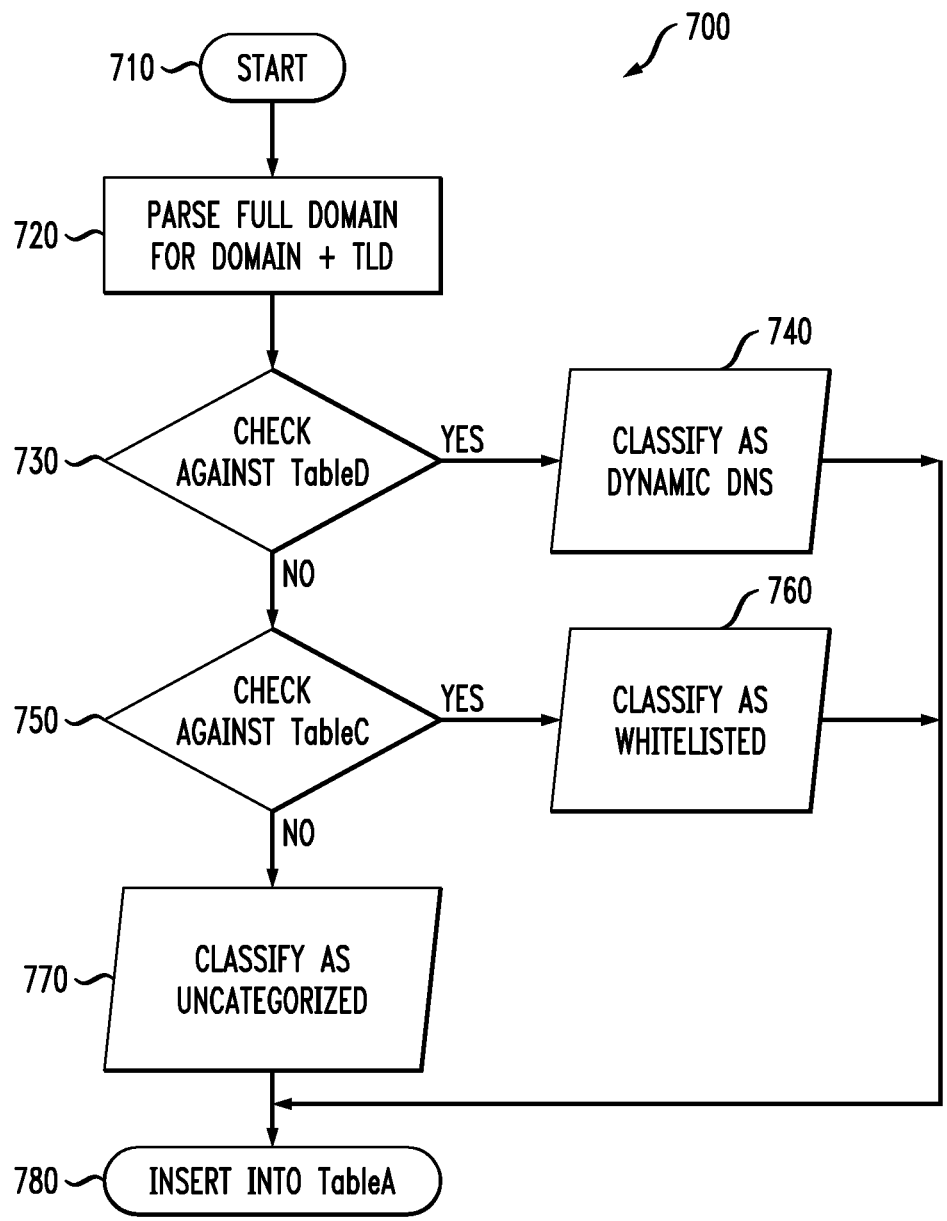
FIG. 7 is a flow chart illustrating an exemplary implementation of an automated domain classification process according to one embodiment of the invention.

FIG. 7 is a flow chart illustrating an exemplary implementation of an automated domain classification process 700 according to one embodiment of the invention. Generally, the exemplary automated domain classification process 700 categorizes domains as they are observed, for example, from a sandbox execution environment. Generally, a sandbox is a protected virtual execution environment, such as one or more virtual machines running on a threat analyzer device, where a file can be safely executed without damaging other applications. After a sandbox execution of malware, the output of the sandbox is analyzed and the domain names resolved by the malware are retrieved and provided as inputs to the exemplary automated domain classification process 700.

As shown in FIG. 7, the exemplary automated domain classification process 700 is started at step 710. The full domain name is parsed, for example, into three parts during step 720 to obtain the top level domain [TLD], domain and sub-domain. In one or more embodiments, this is accomplished by parsing the domain with information from publicsuffix.org to determine the actual TLD, domain and sub-domains. It has been found that use of a built-in split( ) function of a programming language can be insufficient and produce erroneous results.

For example, if the split( ) method was applied on the dot [.] for bbc.co.uk, the following is obtained:
TLD=uk
Domain=co
Sub-Domain=bbc
This is incorrect, as the correct way to parse the example domain is:
TLD=co.uk
Domain=bbc
Sub-Domain=N/A A test is performed during step 730 to compare the domain and top level domain to the dynamic DNS domain table 500 (Table D). If it is determined during step 730 that the domain and top level domain are listed in the dynamic DNS domain table 500, then the domain is classified as a dynamic DNS domain during step 740. The domain is then inserted into the domain table 200 during step 780. If, however, it is determined during step 730 that the domain and top level domain are not listed in the dynamic DNS domain table 500, then a further test is performed during step 750 to compare the domain and top level domain to the trusted domain table 400 (Table C).

If it is determined during step 750 that the domain and top level domain are listed in the trusted domain table 400, then the domain is classified as a whitelested domain during step 760. The domain is then inserted into the domain table 200 during step 780. If, however, it is determined during step 750 that the domain and top level domain are not listed in the trusted domain table 400, then the domain is classified as an uncategorized domain during step 770. The domain is then inserted into the domain table 200 during step 780. For example, the MD5sum hash (or another identifier) of the malware sample, the full domains resolved during the sandbox execution, the classification of each resolved domain, the current date and time in Epoch format as well as the time-to-live attribute from the DNS response are inserted into the exemplary domain table 200 (Table A).

The various classifications can be extended with more tables that match the type of classification desired, such as a domain that has been sinkholed by a threat researcher or domains that are known to be malicious. In one or more embodiments, the automated domain classification process 700 queries for classification from the table with the least amount of entries to the most amount of entries. The automated domain classification process 700 should be designed in such a way that when a domain is reclassified it is added to the table that matches its new classification and then removed from the previous classification table.

For example, if www.microsoft.com is assumed to be whitelisted, the domain and TLD are added to the database schema and example data for a domain-to-IP address table 300 (Table C), so microsoft.com represents the domain and TLD. If a sample resolves genuine.microsoft.com, the "genuine" portion is considered the sub-domain and is not queried for in Table C, only microsoft.com.

A threat intelligence analyst using a web application that queries the database tables of FIGS. 2-5 can now generate lists of domains and IP addresses to be applied to security products to find potentially infected hosts on their network. Sometimes these uncategorized domains turn out to be non-malicious. In one or more embodiments, a web application threat intelligence portal programmed to query the database tables of FIGS. 2-5 contains logic to change these domain classifications. Once a domain classification is changed, all sub-domains for the domain in question are optionally re-categorized to match the domain and TLD. This is accomplished by adding or removing from the columns in the trusted domain table 400 or dynamic DNS domain table 500.

For example, if an analyst came across "genuine.microsoft.com" that was classified as Uncategorized, but wanted to change the domain classification to Whitelisted, the following process would occur:

The true domain and TLD would be determined using methods previously discussed;

The domain and TLD would be added to the trusted domain table 400, "microsoft.com"; and The Category column in the domain table 200 is updated to Whitelist with the following conditions: the Domain column is an exact match for the domain and TLD, "microsoft.com", or the Domain column ends with "." and domain and TLD, "%.microsoft.com".

Reclassifying in this order ensures that sub-domains being ingested concurrently don't have different classifications and introduce fragmentation into the dataset.

If an analyst wished to change the classification for "genuine.microsoft.com" from Whitelisted to Dynamic DNS at a later date, the following process would occur.

The true domain and TLD would be determined using methods previously discussed;

The domain and TLD would be added to the dynamic DNS domain table 500, "microsoft.com";

The domain and TLD would be removed from the trusted domain table 400, "microsoft.com";

The Category column in the domain table 200 is updated to DynDNS with the following conditions: the Domain column is an exact match for the domain and TLD, "microsoft.com", or the Domain column ends with "." and domain and TLD, "%.microsoft.com".

Dynamic DNS is a service provided by a number of service provider companies. Dynamic DNS is used by customers, for example, who want to connect back to their house to look at webcams or other activities. The service providers have an agent that runs on the router or computer of the customers that queries for the external IP of a given customer, usually using checkip.dyndns.org, and then changes the IP address-to-Domain relationship on their authoritative DNS servers 160. This way if your home IP address changes, the domain will always point back to the correct address. The service providers offer low TTL times so that the customers should not lose connectivity for, e.g., more than 5 minutes. Dynamic domains are of interest to threat intelligence researchers, for example, because they comprise attributes that are attractive to an attacker because they offer substantial anonymity (e.g., no real registration is required) and can change the IP address rather quickly if the attacker is getting blocked.

CONCLUSION

One or more embodiments of the invention provide asynchronous techniques for resolving domain names and automated classification of domain type. The foregoing applications and associated embodiments should be considered as illustrative only, and numerous other embodiments can be configured using the techniques disclosed herein, in a wide variety of different applications.

It should also be understood that the asynchronous domain resolution techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed asynchronous domain resolution techniques may be implemented using one or more processing platforms. One or more of the processing modules or other components may therefore each run on a computer, storage device or other processing platform element. A given such element may be viewed as an example of what is more generally referred to herein as a "processing device."

Figure 8:
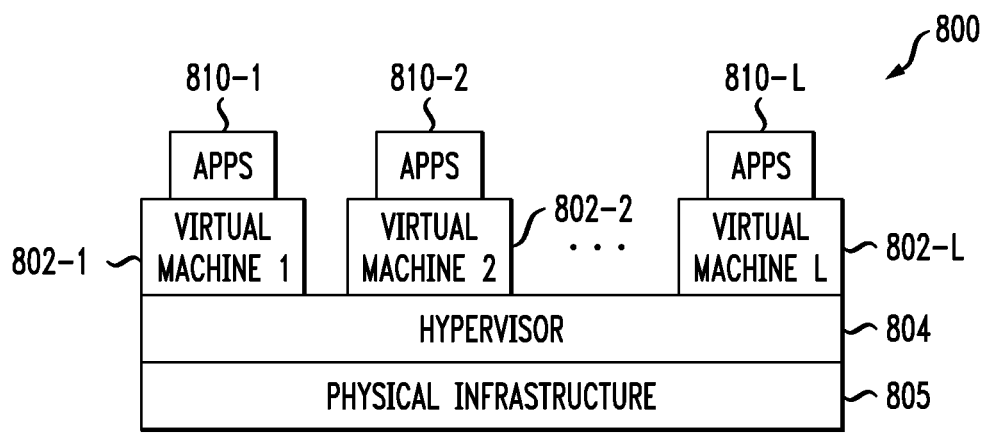
FIG. 8 illustrates an exemplary processing platform that may be used to implement at least a portion of one or more embodiments of the invention comprising a cloud infrastructure.

Referring now to FIG. 8, one possible processing platform that may be used to implement at least a portion of one or more embodiments of the invention comprises cloud infrastructure 800. The cloud infrastructure 800 in this exemplary processing platform comprises virtual machines (VMs) 802-1, 802-2, . . . 802-L implemented using a hypervisor 804. The hypervisor 804 runs on physical infrastructure 805. The cloud infrastructure 800 further comprises sets of applications 810-1, 810-2, . . . 810-L running on respective ones of the virtual machines 802-1, 802-2, . . . 802-L under the control of the hypervisor 804.

The cloud infrastructure 800 may encompass the entire given system or only portions of that given system, such as one or more of client, servers, controllers, or computing devices in the system.

Although only a single hypervisor 804 is shown in the embodiment of FIG. 8, the system may of course include multiple hypervisors each providing a set of virtual machines using at least one underlying physical machine.

An example of a commercially available hypervisor platform that may be used to implement hypervisor 804 and possibly other portions of the system in one or more embodiments of the invention is the VMware® vSphere™ which may have an associated virtual infrastructure management system, such as the VMware® vCenter™. The underlying physical machines may comprise one or more distributed processing platforms that include storage products, such as VNX® and Symmetrix VMAX®, both commercially available from EMC Corporation of Hopkinton, Mass. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

Figure 9:
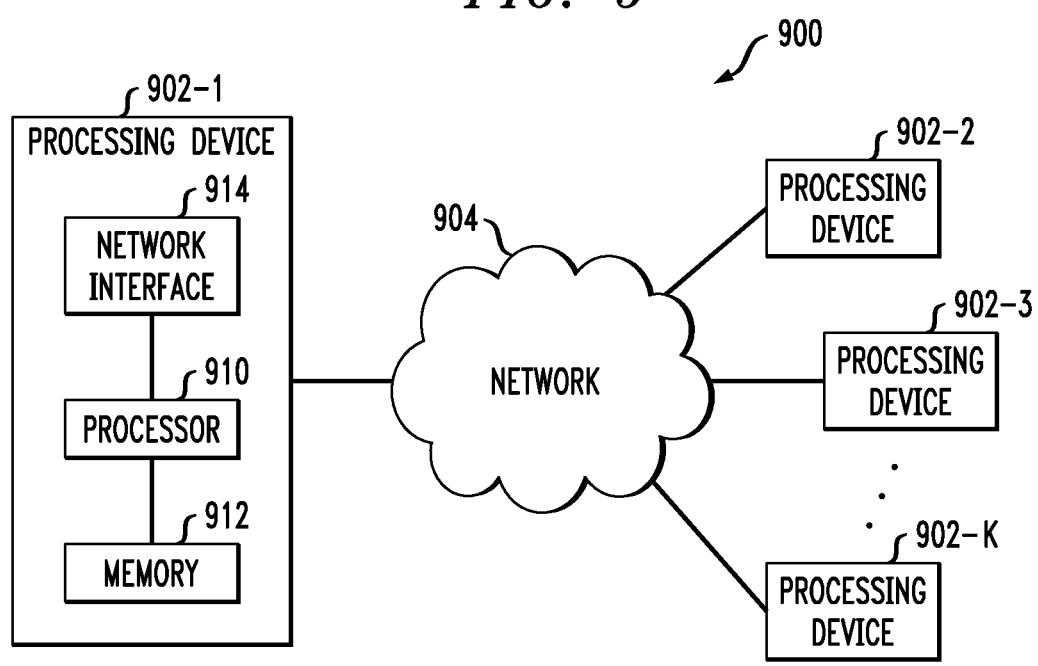
FIG. 9 illustrates another exemplary processing platform that may be used to implement at least a portion of one or more embodiments of the invention.

Another example of a processing platform is processing platform 900 shown in FIG. 9. The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an application specific integrated circuit (ASIC), a field programmable gate array (FPGA) or other type of processing circuitry, as well as portions or combinations of such circuitry elements, and the memory 912, which may be viewed as an example of a "computer program product" having executable computer program code embodied therein, may comprise random access memory (RAM), read only memory (ROM) or other types of memory, in any combination.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 8 or 9, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

Also, it should again be emphasized that the above-described embodiments of the invention are presented for purposes of illustration only. Many variations and other alternative embodiments may be used. For example, the disclosed techniques are applicable to a wide variety of other types of communication systems, storage systems and processing devices. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method, comprising:
    obtaining at least one domain name included in one or more malware domain resolution requests;
    obtaining a domain table identifying a plurality of known domains in a domain name system;
    obtaining a dynamic domain table identifying a plurality of domains classified as a dynamic domain name system domain in a dynamic domain name system;
    parsing a full domain name associated with said at least one domain name from said one or more malware domain resolution requests into a top level domain and a domain;
    classifying said at least one domain name from said one or more malware domain resolution requests as a dynamic domain name system domain in the dynamic domain name system when said top level domain and said domain are found in said dynamic domain table; and
    storing said classification of said at least one domain name from said one or more malware domain resolution requests as said dynamic domain name system domain in said domain table with a complete domain of said at least one domain, a current date and time and a Time-To-Live attribute of said at least one domain from a response of the domain name system.

2. The method of claim 1, further comprising the steps of obtaining a whitelist table identifying a plurality of trusted domains, and classifying said at least one domain name as a trusted domain if said top level domain and said domain are found in said whitelist table.

3. The method of claim 2, further comprising the step of classifying said at least one domain name as an uncategorized domain if said top level domain and said domain are not found in said dynamic domain table and said whitelist table.

4. The method of claim 1, further comprising the step of automatically re-classifying said domain and wherein all sub-domains of the domain are re-categorized to match the domain and top level domain of the re-classified domain.

5. The method of claim 1, further comprising the step of monitoring communications of malware to obtain said one or more domain resolution requests.

6. The method of claim 1, further comprising the step of automatically reclassifying a given one of said known domains in said domain table such that all sub-domains of the reclassified known domain are updated to match the top level domain and the domain of said reclassified known domain.

7. The method of claim 1, wherein the one or more malware domain resolution requests are obtained from a sandbox execution environment.

8. A computer program product, comprising a non-transitory machine-readable storage medium having encoded therein executable code of one or more software programs, wherein the one or more software programs when executed by at least one processing device perform the following steps:
    obtaining at least one domain name included in one or more malware domain resolution requests;
    obtaining a domain table identifying a plurality of known domains in a domain name system;

obtaining a dynamic domain table identifying a plurality of domains classified as a dynamic domain name system domain in a dynamic domain name system;

parsing a full domain name associated with said at least one domain name from said one or more malware domain resolution requests into a top level domain and a domain;

classifying said at least one domain name from said one or more malware domain resolution requests as a dynamic domain name system domain in the dynamic domain name system when said top level domain and said domain are found in said dynamic domain table; and storing said classification of said at least one domain name from said one or more malware domain resolution requests as said dynamic domain name system domain in said domain table with a complete domain of said at least one domain, a current date and time and a Time-To-Live attribute of said at least one domain from a response of the domain name system.

9. The computer program product of claim 8, further comprising the steps of obtaining a whitelist table identifying a plurality of trusted domains, and classifying said at least one domain name as a trusted domain if said top level domain and said domain are found in said whitelist table.

10. The computer program product of claim 9, further comprising the step of classifying said at least one domain name as an uncategorized domain if said top level domain and said domain are not found in said dynamic domain table and said whitelist table.

11. The computer program product of claim 8, further comprising the step of automatically re-classifying said domain and wherein all sub-domains of the domain are re-categorized to match the domain and top level domain of the re-classified domain.

12. The computer program product of claim 8, further comprising the step of monitoring communications of malware to obtain said one or more domain resolution requests.

13. The computer program product of claim 8, further comprising the step of automatically reclassifying a given one of said known domains in said domain table such that all sub-domains of the reclassified known domain are updated to match the top level domain and the domain of said reclassified known domain.

14. The computer program product of claim 8, wherein the one or more malware domain resolution requests are obtained from a sandbox execution environment.

15. A system, comprising:
a memory; and
at least one processing device, coupled to the memory, operative to implement the following steps:

obtaining at least one domain name included in one or more malware domain resolution requests;

obtaining a domain table identifying a plurality of known domains in a domain name system;

obtaining a dynamic domain table identifying a plurality of domains classified as a dynamic domain name system domain in a dynamic domain name system;

parsing a full domain name associated with said at least one domain name from said one or more malware domain resolution requests into a top level domain and a domain;

classifying said at least one domain name from said one or more malware domain resolution requests as a dynamic domain name system domain in the dynamic domain name system when said top level domain and said domain are found in said dynamic domain table; and storing said classification of said at least one domain name from said one or more malware domain resolution requests as said dynamic domain name system domain in said domain table with a complete domain of said at least one domain, a current date and time and a Time-To-Live attribute of said at least one domain from a response of the domain name system.

16. The system of claim 15, further comprising the steps of obtaining a whitelist table identifying a plurality of trusted domains, and classifying said at least one domain name as a trusted domain if said top level domain and said domain are found in said whitelist table.

17. The system of claim 16, further comprising the step of classifying said at least one domain name as an uncategorized domain if said top level domain and said domain are not found in said dynamic domain table and said whitelist table.

18. The system of claim 15, further comprising the step of automatically re-classifying said domain and wherein all sub-domains of the domain are re-categorized to match the domain and top level domain of the re-classified domain.

19. The system of claim 15, further comprising the step of monitoring communications of malware to obtain said one or more domain resolution requests.

20. The system of claim 15, further comprising the step of automatically reclassifying a given one of said known domains in said domain table such that all sub-domains of the reclassified known domain are updated to match the top level domain and the domain of said reclassified known domain.

* * * * *